Feb. 5, 1929.
H. J. LAWRENZ
1,701,412
MULTIPLE FACE AND POINTER CONSTRUCTION FOR GAUGING
INSTRUMENTS AND WEIGHING MACHINES
Filed Sept. 20, 1928
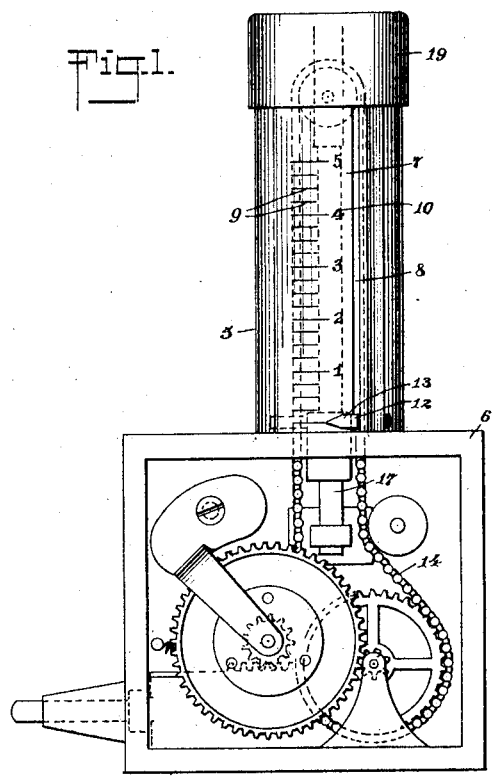
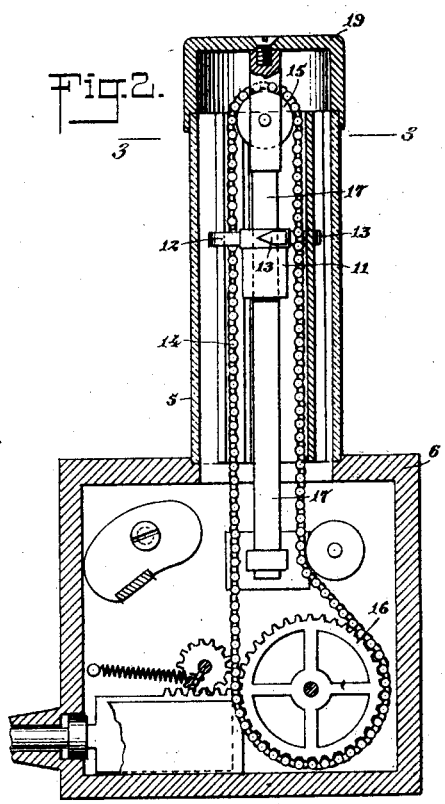
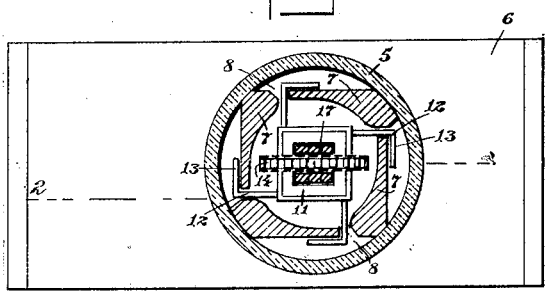
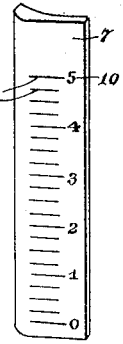
WITNESSES
INVENTOR
Henry J. Lawrenz
BY
ATTORNEY Patented Feb. 5, 1929.

1,701,412

UNITED STATES PATENT OFFICE.

HENRY J. LAWRENZ, OF BROOKLYN, NEW YORK.

MULTIPLE FACE AND POINTER CONSTRUCTION FOR GAUGING INSTRUMENTS AND WEIGHING MACHINES.

Application filed September 20, 1928. Serial No. 307,166.

This invention relates generally to the class of indicating devices, and has particular reference to improved dial and pointer construction constituting an element of one of a variety of gauging instruments, weighing machines, etc.

Up to the present time, gauging instruments are provided with dial faces and pointers which necessitate their reading by observation of the same from one direction only. Obviously, this in many instances, causes no little inconvenience, in addition to a loss of time, in making a reading therefrom.

To overcome the above mentioned disadvantages and objections, the present invention comprehends an indicator which is provided with a plurality of dial faces and pointers whereby the same may be read from practically any direction in which it is viewed, thus materially increasing the efficiency thereof.

The invention further contemplates a multiple face and pointer construction for gauging instruments which is not unduly complicated, which is inexpensive to produce and which is highly efficient in its purpose.

With the above recited and other objects in view, reference is had to the following description and accompanying drawings, in which there is exhibited one example or embodiment of the invention, while the claims define the actual scope of the same.

In the drawings:

Figure 1 is a side view of a gauging instrument including a dial and pointer construction in accordance with the invention.

Figure 2 is a vertical sectional view therethrough taken approximately on the line indicated at 2—2 in Figure 3.

Figure 3 is an enlarged horizontal sectional view taken approximately on the line indicated at 3—3 in Figure 2.

Figure 4 is a detail perspective view of one of the dial face plates disassembled.

Referring to the drawings by characters of reference, the indicator constituting the present invention includes a tubular casing 5 of transparent material which is suitably attached or connected with the body 6 of the gauging instrument, which instrument may be of any type or for any purpose. A plurality of similarly constructed dial face plates 7 are attached to the inner surface of the tubular casing 5 in spaced relation to each other and projecting inwardly therefrom to define between the adjacent blades, slots 8 which extend longitudinally of the casing 5. The outer surfaces of the dial face plates are provided with suitable graduations 9 and indicia 10 relative thereto. A slide 11 is mounted for longitudinal or axial movement within the casing and is disposed behind the dial faces. The slide is provided with a plurality of pointers 12 corresponding in number to the number of dial plates 7, which pointers extend through the slots 8 and are provided with angularly disposed terminals 13 designed to move over the graduations 9. Any suitable means may be employed for operatively connecting the slide with the actuating element or elements of the gauging instrument, but as illustrated, said means consists of an endless flexible sprocket chain 14 which is trained around the sprocket wheels 15 and 16, it being understood that one leaf of the sprocket chain is secured or attached to the slide 11 for effecting longitudinal movement of the slide in opposite directions in accordance with the movement of the sprocket chain. In practice, the slide is preferably mounted on a guide 17, such as a bar or rod. If desired, the guide rod or bar 17 may also serve in the capacity of a support for one or both of the sprocket wheels 15 and 16, and in addition, said guide rod or bar may serve the purpose of anchoring the casing 5 to the body 6 of the instrument by attaching a cap 19 to one end of said rod or bar, the opposite end of which is anchored or secured to the body of the instrument.

In use and operation, it is apparent that with the multiplicity of dial faces and pointers circumferentially or otherwise arranged to face in a plurality of directions, that readings may be taken irrespective of the radial direction of the eye of the observer with respects to the indicator.

What is claimed is:

1. In a gauging instrument, a tubular transparent casing, a plurality of dial faces projecting inwardly therefrom, a slide disposed within the casing and behind the dial faces for longitudinal movement and a pointer for each dial face connected to the slide for movement therewith.

2. In a gauging instrument, a tubular transparent casing, a plurality of dial faces projecting inwardly therefrom, a slide disposed within the casing and behind the dial faces for longitudinal movement, a pointer for each dial face connected to the slide for movement therewith and an operative connection between a moving part of the gauging instrument and the slide for effecting longitudinal movement thereof.

3. In a gauging instrument, a tubular transparent casing, a plurality of dial faces projecting inwardly therefrom, a slide disposed within the casing and behind the dial faces for longitudinal movement, a pointer for each dial face connected to the slide for movement therewith and a longitudinally extending guide upon which the slide is mounted for longitudinal movement.

4. In a gauging instrument, a tubular transparent casing, a plurality of dial faces projecting inwardly therefrom, a slide disposed within the casing and behind the dial faces for longitudinal movement, a pointer for each dial face connected to the slide for movement therewith, a longitudinally extending guide upon which the slide is mounted for longitudinal movement and means operatively connected with the slide and with a moving part of the gauging instrument for effecting longitudinal movement of the slide on its guide.

5. In a gauging instrument, a tubular transparent casing, a plurality of dial faces projecting inwardly therefrom, a slide disposed within the casing and behind the dial faces for longitudinal movement, a pointer for each dial face connected to the slide for movement therewith, a longitudinally extending guide upon which the slide is mounted for longitudinal movement and means operatively connected with the slide and with a moving part of the gauging instrument for effecting longitudinal movement of the slide on its guide, said means consisting of an endless flexible element, guide members around which same is trained to dispose one lead of said flexible element within the casing and a connection between said lead and the slide.

Signed at New York, in the county of New York, and State of New York, this 18th day of September A. D. 1928.

HENRY J. LAWRENZ.